US012604097B2

(12) United States Patent
Tseng et al.

(10) Patent No.: US 12,604,097 B2
(45) Date of Patent: Apr. 14, 2026

(54) EXPOSURE CONVERGENCE METHOD AND RELATED IMAGE PROCESSING DEVICE

(71) Applicant: MEDIATEK INC., Hsin-Chu (TW)

(72) Inventors: Yen-Hsiang Tseng, Hsinchu City (TW); Wei-Te Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 153 days.

(21) Appl. No.: 18/544,465

(22) Filed: Dec. 19, 2023

(65) Prior Publication Data

US 2024/0357242 A1 Oct. 24, 2024

Related U.S. Application Data

(60) Provisional application No. 63/460,319, filed on Apr. 19, 2023.

(51) Int. Cl.
*H04N 23/73* (2023.01)
*H04N 23/71* (2023.01)
*H04N 23/72* (2023.01)
*H04N 23/76* (2023.01)

(52) U.S. Cl.
CPC ............. *H04N 23/73* (2023.01); *H04N 23/71* (2023.01); *H04N 23/76* (2023.01)

(58) Field of Classification Search
CPC ........ H04N 23/73; H04N 23/71; H04N 23/76; H04N 23/72
See application file for complete search history.

(56) References Cited

U.S. PATENT DOCUMENTS

2015/0244918 A1* 8/2015 Svensson ............... H04N 23/72
                                                            348/229.1

* cited by examiner

*Primary Examiner* — Ahmed A Berhan
(74) *Attorney, Agent, or Firm* — Winston Hsu

(57) ABSTRACT

An exposure convergence method of showing forward change of image intensity in response to drastic change of ambient light and applied to an image processing device includes utilizing an exposure function to acquire an initial intensity of a detection image provided by an image sensor, providing an exposure setting parameter to the image sensor for generating an input image with a first intensity in accordance with an analysis result of the initial intensity, and utilizing a gain parameter to adjust the input image for generating an output image with a second intensity, so that the second intensity of a plurality of sequential output images is gradually varied in one direction.

18 Claims, 6 Drawing Sheets

10

EXPOSURE CONVERGENCE METHOD AND RELATED IMAGE PROCESSING DEVICE

CROSS REFERENCE TO RELATED APPLICATIONS

This application claims the benefit of U.S. Provisional Application No. 63/460,319, filed on Apr. 19, 2023. The content of the application is incorporated herein by reference.

BACKGROUND

A conventional camera includes an image sensor and a processor. The image sensor captures a series of images. The processor analyzes each of the series of images to acquire an intensity of each image, and provides exposure settings according to an analysis result of the intensity to the image sensor. When the conventional camera is moved from dark scene to a bright scene, the initial images captured by the image sensor without modification of the exposure settings provided by the processor are overexposed; then, the image sensor captures following images with modified intensity lower than the initial intensity of the initial images for convergence. If the exposure settings are set as the large scale, the modified intensity of the following images may be changed in a darker condition and needs to further increase its intensity, which results in intensity reverse; if the exposure settings are set as the small scale, the image sensor using the modified exposure settings has to capture a lot of following images to reach the expected intensity. Thus, design of an exposure convergence method of rapidly acquiring the preferred image intensity without reverse is an important issue in the related image processing industry.

SUMMARY

The present invention provides an exposure convergence method of showing images with gradual and smooth change of intensity and a related image processing device of executing the foresaid exposure convergence method for solving above drawbacks.

According to the claimed invention, an exposure convergence method of showing forward change of image intensity in response to drastic change of ambient light includes acquiring an initial intensity of a detection image provided by an image sensor, providing an exposure setting parameter to the image sensor for generating an input image with a first intensity in accordance with an analysis result of the initial intensity, and utilizing a gain parameter to adjust the input image for generating an output image with a second intensity, so that the second intensity of a plurality of sequential output images is gradually varied in one direction.

According to the claimed invention, an image processing device of executing an exposure convergence function includes an image sensor and a processing module. The image sensor is adapted to provide a detection image. The processing module is electrically connected with the image sensor. The processing module is adapted to acquire an initial intensity of a detection image provided by an image sensor, provide an exposure setting parameter to the image sensor for generating an input image with a first intensity in accordance with an analysis result of the initial intensity, and utilize a gain parameter to adjust the input image for generating an output image with a second intensity, so that the second intensity of a plurality of sequential output images is gradually varied in one direction.

The exposure convergence method and the image processing device of the present invention can analyze the statistics values of the detection image to decide the exposure setting parameter, and apply the exposure setting parameter to the image sensor for generating the input images. The input images may have the phenomenon of intensity reverse, so that the exposure convergence method and the image processing device of the present invention can further utilize the gain parameter to transform the input images into the output images, and the output images can be further adjusted via the clip function for showing the forward change of the second intensity even though the ambient light around the image sensor is drastically changed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
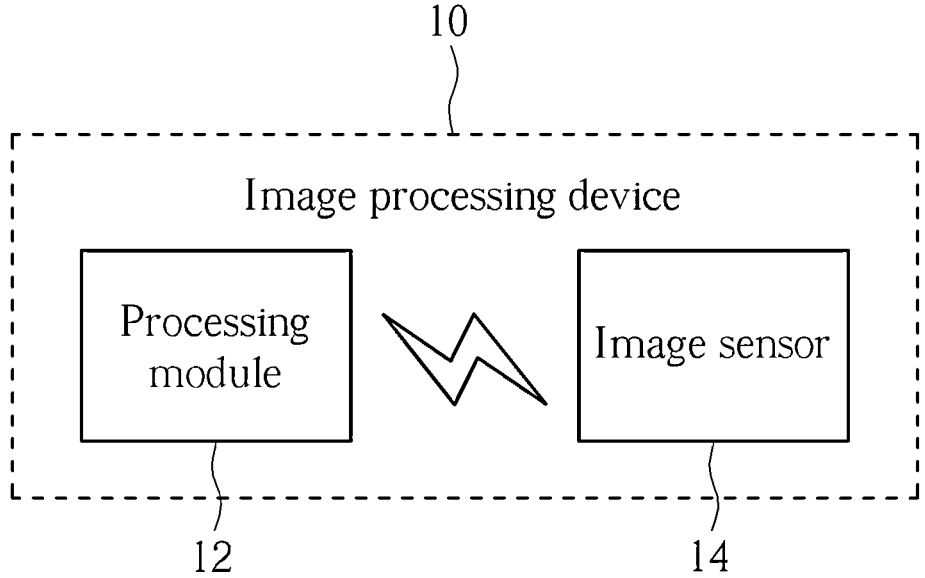
FIG. 1 is a functional block diagram of an image processing device according to an embodiment of the present invention.

Please refer to FIG. 1. FIG. 1 is a functional block diagram of an image processing device 10 according to an embodiment of the present invention. The image processing device 10 can be applied to any portable image capturing apparatus, such as the camera or the mobile phone, which depends on an actual demand. In the preferred embodiment, the image processing device 10 can include a processing module 12, and the processing module 12 can be communicated with an image sensor 14. The image sensor 14 is an element independent of and separated from the image processing device 10. The image sensor 14 can capture a series of detection images. The processing module 12 can receive the series of detection images in a wired manner or in a wireless manner, and analyze each of the series of detection images to execute an exposure convergence function, so as to smoothly adjust intensity of the series of detection images when ambient light around the image sensor 14 is drastically changed.

In other possible embodiment, the image processing device 10 may include the processing module 12 and the image sensor 14 communicated with each other in the wired manner or in the wireless manner. The image sensor 14 can be a built-in element of the image processing device 10. The processing module 12 can be an image signal processor, an operation processor, or any possible hardware independent of the image sensor 14, and used to receive the series of detection images from the image sensor 14 for executing the exposure convergence function. The processing module 12 can further be a part of the image sensor 14, such as a unit or software or hardware inside the image sensor 14, and can acquire the series of detection images for executing the exposure convergence function.

When the image sensor 14 is moved from a dark scene to a bright scene, each of the series of detection images captured by the image sensor 14 may be overexposed, and an exposure setting parameter of the image sensor 14 can be adjusted to further capture unexposed images by decreasing intensity of the newly captured images until the intensity of the newly captured images tend to a normal condition; in this condition, the detection image can be analyzed to acquire an initial exposure value (or the initial exposure value may be a preset value or a known value), and a predefined exposure threshold can be set to define an intensity difference between the detection image and the newly captured image after adjustment of the exposure setting parameter. The newly adjusted exposure setting parameter may make the newly captured image darker, so that the intensity of the image captured with the exposure setting parameter can be lower than the intensity of the image captured with the initial exposure value. In one embodiment, the exposure setting parameter may have a specific difference between the initial exposure value and the exposure setting parameter equal to a predefined exposure threshold. Actual values of the predefined exposure threshold and the related exposure setting parameter can depend on the design demand, and a detailed description is omitted herein for simplicity. In some other embodiments, the exposure setting parameter may be modified or adjusted adaptively, which should not be limited in this disclosure.

When the image sensor 14 is moved from the bright scene to the dark scene, each of the series of detection images captured by the image sensor 14 may have low intensity, and the exposure setting parameter of the image sensor 14 can be adjusted for increasing intensity of the newly captured images until the intensity of the newly captured images tend to the normal condition. The exposure convergence function of the image processing device 10 in the present invention is mainly applied for a condition of the image sensor 14 moved from the dark scene to the bright scene, but still can be used to another condition of the image sensor 14 moved from the bright scene to the dark scene. It should be mentioned that adjustment of the exposure setting parameter may fiercely change the intensity of the newly captured images to an unusual condition, so that the image processing device 10 can execute an exposure convergence method of the present invention to modify the newly captured images via a gain function 18 of the processing module 12 so as to show smoothly forward change of the image intensity in response to drastic change of the ambient light.

Figure 2:
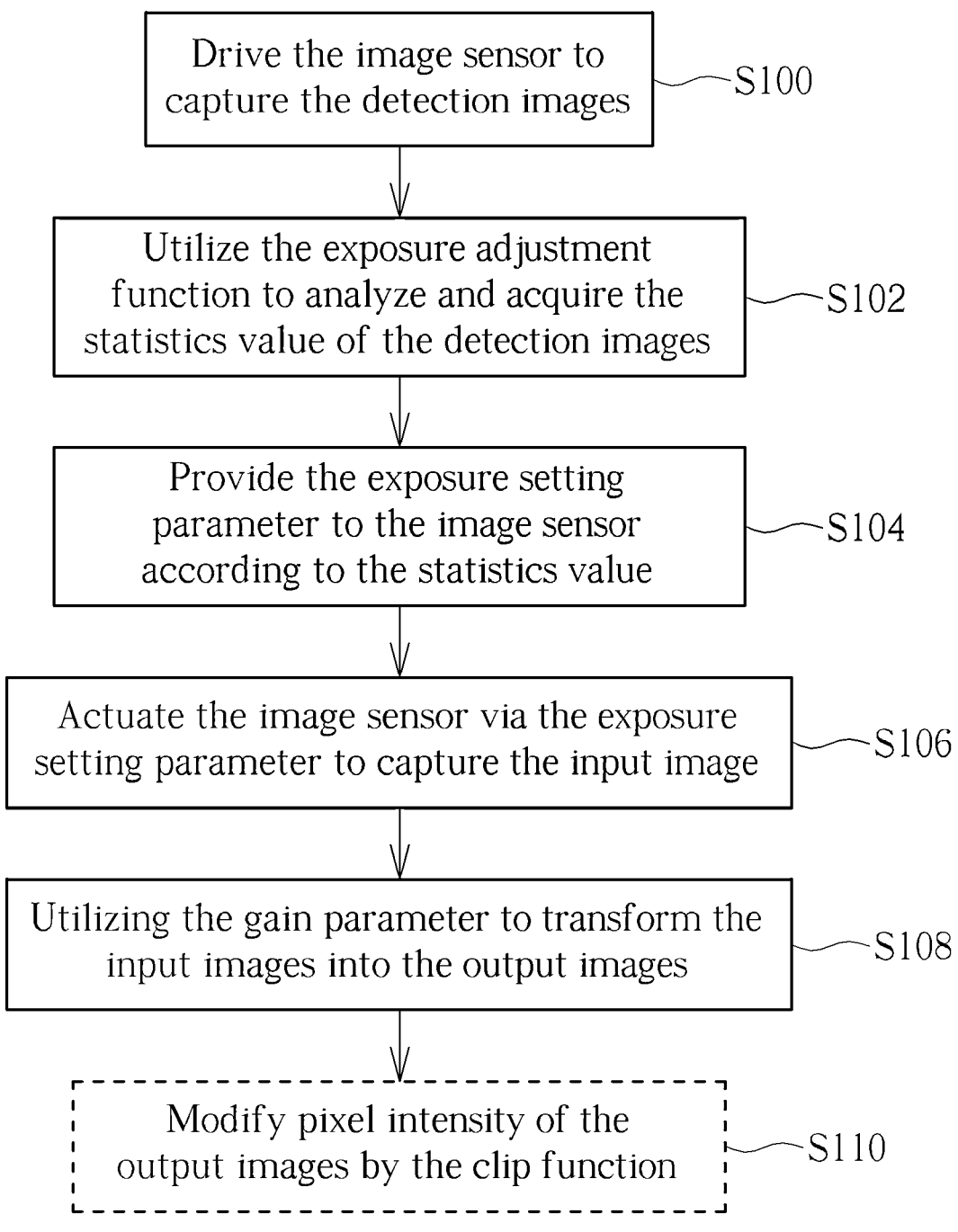
FIG. 2 is a flow chart of the exposure convergence method according to the embodiment of the present invention.
Figure 3:
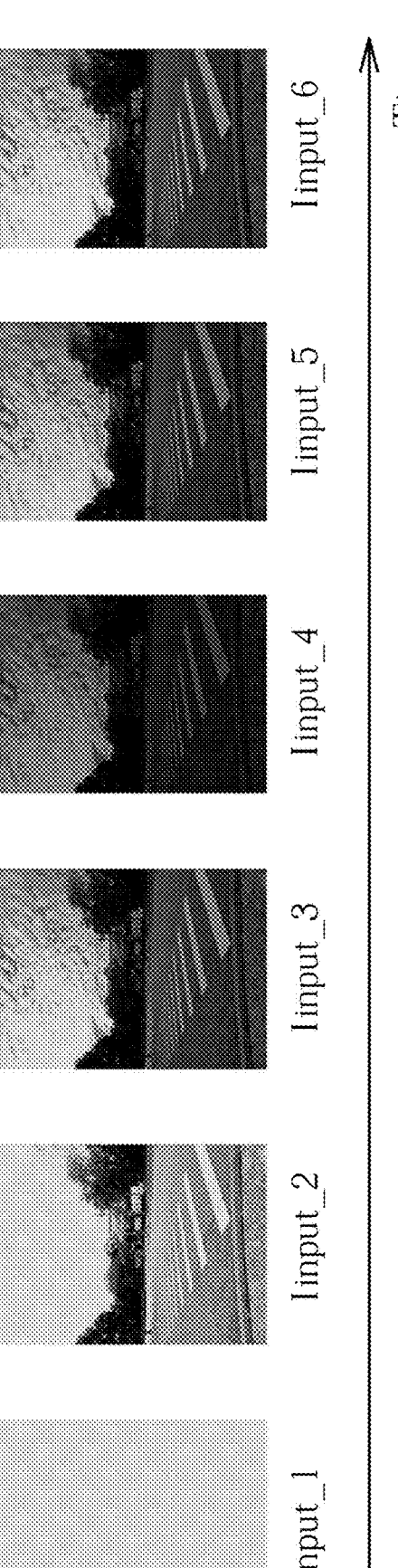
FIG. 3 and FIG. 4 are diagrams of intensity variation of newly captured images changed by the exposure convergence method according to the embodiment of the present invention.
Figure 4:
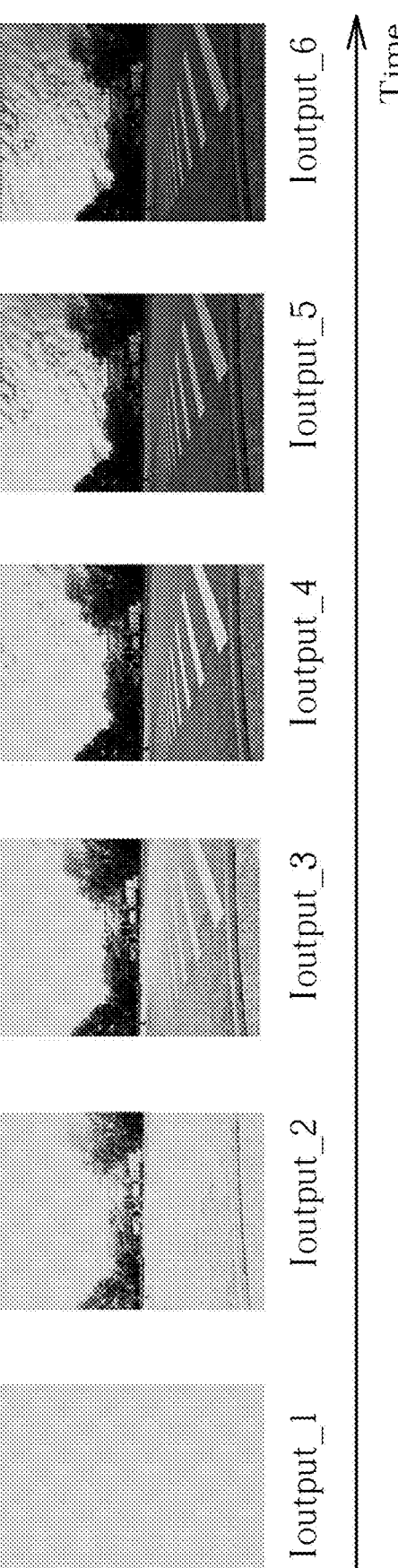
Figure 5:
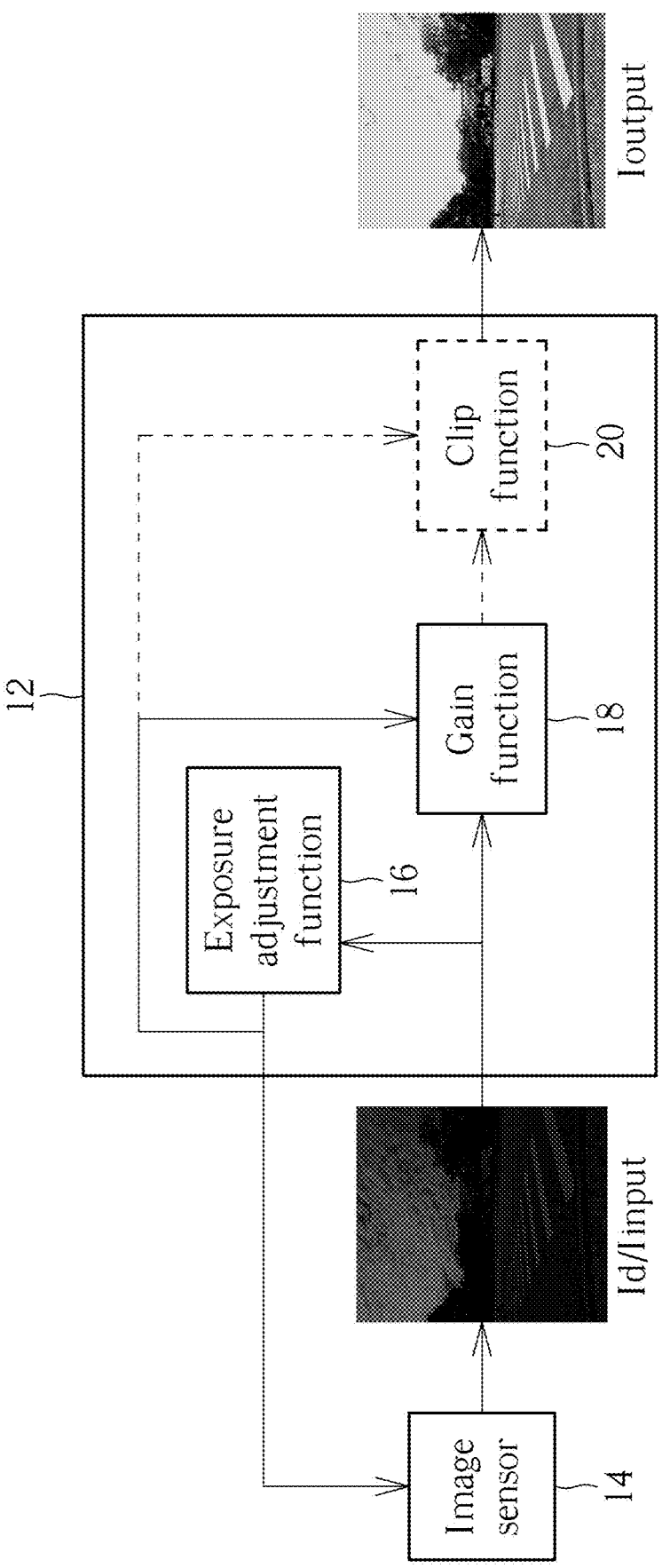
FIG. 5 is a diagram of relation between a processing module, an image sensor, and the newly captured images generated by the image sensor according to the embodiment of the present invention.
Figure 6:
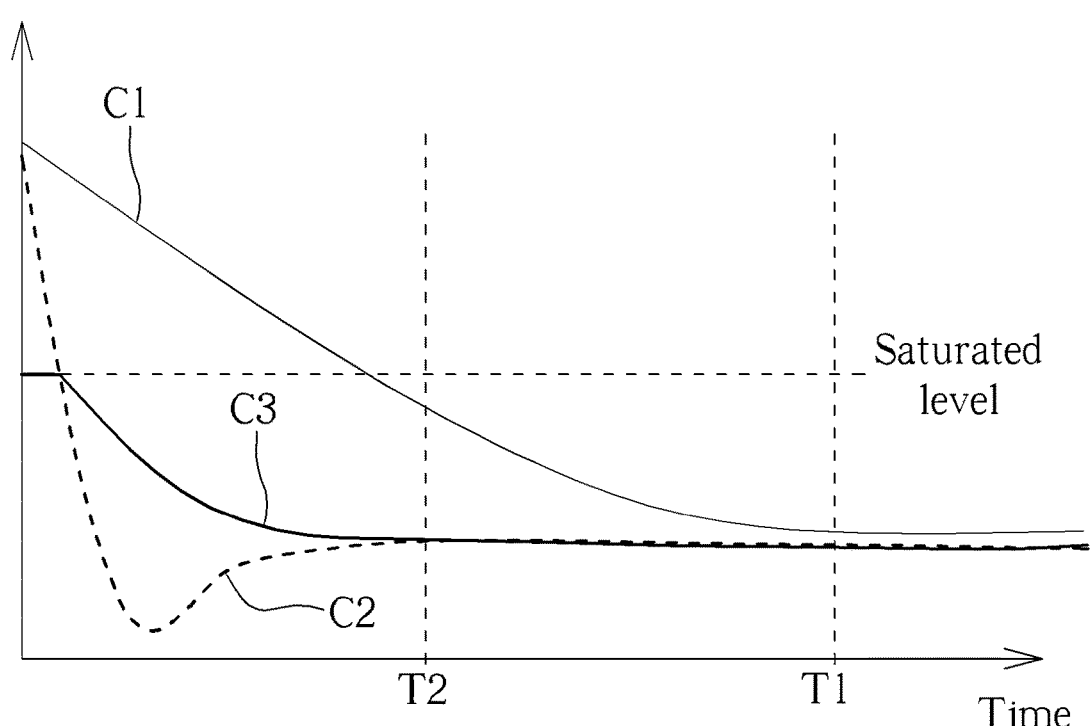
FIG. 6 is a diagram of intensity variation of the newly captured images according to the embodiment of the present invention.

Please refer to FIG. 2 to FIG. 6. FIG. 2 is a flow chart of the exposure convergence method according to the embodiment of the present invention. FIG. 3 and FIG. 4 are diagrams of intensity variation of the newly captured images changed by the exposure convergence method according to the embodiment of the present invention. FIG. 5 is a diagram of relation between the processing module 12, the image sensor 14, and the newly captured images generated by the image sensor 14 according to the embodiment of the present invention. FIG. 6 is a diagram of intensity variation of the newly captured images according to the embodiment of the present invention. The exposure convergence method illustrated in FIG. 2 can be suitable for the image processing device 10 shown in FIG. 1. In the following embodiment, the exposure convergence method is applied to the image sensor 14 moved from the dark scene to the bright scene; however, the exposure convergence method can further be applicable in response to the image sensor 14 moved from the bright scene to the dark scene, and the detailed illustration is omitted herein for simplicity.

First, step S100 can be executed by the processing module 12 to drive the image sensor 14 to capture the series of detection images Id. Each of the series of detection images Id is captured by an original exposure setting, and may have an overexposed condition if the image sensor 14 is just moved from the dark scene to the bright scene, or may have the low intensity if the image sensor 14 is moved from the bright scene to the dark scene. Therefore, step S102 can be executed to utilize an exposure adjustment function 16 (for example, an auto exposure (AE) function or any other function to adjust exposure) of the image processing device 10 to analyze each detection image Id and acquire an initial intensity of the detection image Id. The initial intensity may be compared with a predefined intensity range, for deciding whether the detection image Id conforms to the normal condition. The predefined intensity range can be set in accordance with performance property of the image sensor 14, and the actual value is omitted herein for simplicity.

After that, step S104 and step S106 can be executed to analyze the initial intensity and provide an exposure setting parameter to the image sensor 14 in accordance with an analysis result of the initial intensity, and to actuate the image sensor 14 via the exposure setting parameter for capturing a series of input images Iinput. The exposure adjustment function 16 can acquire and analyze statistics values of the detection image Id to decide the initial intensity; the statistics values may contain several parameters, which are omitted herein for simplicity, and the intensity inside the statistics values can be extracted for setting the exposure setting parameter. The exposure setting parameter may contain several parameter, such as a sensor gain and a shutter speed of the image sensor 14, and the exposure adjustment function 16 can reset the sensor gain and the shutter speed (which means the exposure setting parameter in step S104) of the image sensor 14 for lowering the intensity of the newly captured images (or called the series of input images Iinput here). The exposure setting parameter reset in step S104 leads to the image captured using the reset exposure setting parameter is darker than the image captured using an original exposure setting of the image sensor 14 in step S100, such as the higher shutter speed and a lower setting of aperture value, if the image sensor 14 is moved from the dark scene to the bright scene. The input image Iinput can have a first intensity lower than the initial intensity of the detection image Id, and may be further lower than the predefined intensity range, so that the first intensity of the series of input images Iinput may be too low (i.e., the input images Iinput may be too dark) and results in intensity reverse in the following process. Therefore, step S108 can be executed to utilizing a gain parameter to adjust the first intensity of the input images Iinput for generating a series of output images Ioutput. The output images Ioutput can have a second intensity set between the initial intensity and the first intensity, and may further conform to or be within the predefined intensity range, so the series of output images Ioutput can show the smoothly forward change of the image intensity.

In step S108, the exposure adjustment function 16 can analyze the exposure setting parameter and a target brightness to decide the gain parameter of the processing module 12, so as to keep the series of output images Ioutput in the predefined intensity range for being displayed on a screen electrically connected with the image processing device 10. The target brightness may correspond to a suitable intensity that the image can be comfortably watched and details of the image can be clearly showed observed. An actual value of the target brightness can depend on the design demand. The first intensity may be lower than the intensity corresponding to the target brightness, and the second intensity determined based on the first intensity and the gain parameter may be greater than the intensity corresponding to the target brightness. As shown in FIG. 3, the first intensity of the input images Iinput_1, Iinput_2, Iinput_3 and Iinput_4 are gradually decreased, but the first intensity of the input image Iinput_4 can be defined as lower than the predefined intensity range; then, the first intensity of the input image Iinput_5 are increased to be greater than the first intensity of the input image Iinput_4, and later the first intensity of the input image Iinput_6 are further increased for finishing intensity convergence. The intensity reverse can be shown in the input images from Iinput_3 to Iinput_4 (become darker) and further to Iinput_5 (become brighter), which means the first intensity of a plurality of sequential input images Iinput is varied in opposite directions (from the direction becoming darker and then reversing to the direction become brighter). As shown in FIG. 4, the second intensity of the output images Ioutput_1, Ioutput_2, Ioutput_3, Ioutput_4, Ioutput_5 and Ioutput_6 are gradually decreased (i.e., becoming darker gradually) until the intensity convergence is finished, and do not have the intensity reverse.

As shown in FIG. 6, a curve C1 can be represented as conventional intensity convergence of the detection images Id acquired in a period that the image sensor 14 is moved from the dark scene to the bright scene. The previous detection images Id in the curve C1 can have the initial intensity greater than a saturated level (which may be set in accordance with the predefined intensity range) and a convergence period of the curve C1 is a time difference between a point T1 of time and an original point of time. A curve C2 can be represented as intensity variation of the series of input images Iinput acquired in the same period that the image sensor 14 is moved from the dark scene to the bright scene. The previous input images Iinput in the curve C2 can have the first intensity fiercely lower than the saturated level, and may be lower than a final convergence intensity so as to result in the intensity reverse. A curve C3 can be represented as intensity variation of the series of output images Ioutput acquired in the same period that the image sensor 14 is moved from the dark scene to the bright scene. The previous output images Ioutput in the curve C3 can have the second intensity set between the saturated level and the final convergence intensity, and the second intensity of the following output images Ioutput can be gradually varied and decreased in one direction until being converged to the final convergence intensity, such as at a point T2 of time. The conventional convergence procedure of the detection images Id is finished at the point of time T1. The convergence procedure provided by the exposure convergence method of the present invention can be finished at the point of time T2, so the image processing device 10 can have rapid convergence speed. The series of output images Ioutput does not have a phenomenon of the intensity reverse while intensity variation of parts of the series of input images Iinput can be opposite to intensity variation of corresponding output images Ioutput, as further shown in FIG. 3 and FIG. 4.

Figure 7:
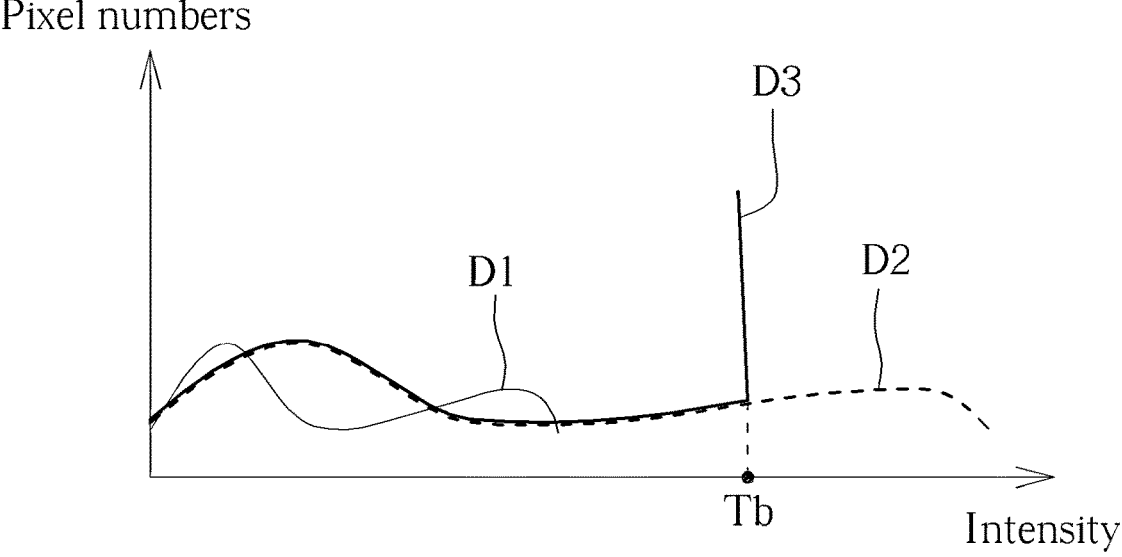
FIG. 7 is a diagram of intensity distribution of pixels on an input image and an output image and a modified output image according to the embodiment of the present invention.

Please refer to FIG. 7. FIG. 7 is a diagram of intensity distribution of pixels on the input image Iinput and the output image Ioutput and a modified output image Ioutput according to the embodiment of the present invention. In one possible embodiment, brightest details of the input image Iinput may be increased and then decreased gradually due to the foresaid exposure adjustment of the image sensor 14, and step S110 can be optionally executed to acquire a predefined intensity threshold Tb and modify the intensity of one or some pixels inside the output image Ioutput exceeding the predefined intensity threshold Tb to the predefined intensity threshold Tb via a clip function 20, so that details of the brightest region in the output image Ioutput can be changed forwardly frame by frame for more brightest details. As shown in FIG. 7, first distribution D1 can be represented as the intensity distribution of pixels on the input image Iinput. The first distribution D1 can be transformed into second distribution D2 via the gain parameter of the gain function 18, and the second distribution D2 can be represented as the intensity distribution of pixels on the output image Ioutput. Therefore, the pixel intensity of the second distribution D2 lower than the predefined intensity threshold Tb are not adjusted, and the pixel intensity of the second distribution D2 exceeding the predefined intensity threshold Tb can be adjusted to a value of the predefined intensity threshold Tb via the clip function 20, and therefore third distribution D3 can be formed accordingly.

The third distribution D3 can be represented as the intensity distribution of pixels on the modified output image Ioutput, so that high intensity details of the modified output image Ioutput can be varied gradually and smoothly in one direction. The foresaid predefined intensity threshold Tb can be decided via an analysis result of the intensity distribution of the input image Iinput and/or the output image Ioutput. The pixels having intensity over the predefined intensity threshold Tb cannot be clearly watched, and the processing module 12 can utilize the clip function 20 to clip the overexposed pixels for showing smooth variation of the high intensity details on the modified output images Ioutput.

In conclusion, the exposure setting parameter of the image sensor can be adjusted to acquire the image having the lower intensity and then further to acquire the image having the greater intensity, so as to get the brightest details of the next images for preferred convergence; besides, the intensity of the images can be forwardly changed by the gain parameter for being distinguished from conventional automatic exposure algorithm. The exposure convergence method and the image processing device of the present invention can analyze the statistics values of the detection image to decide the exposure setting parameter, and apply the exposure setting parameter to the image sensor for generating the input images. The input images may have the phenomenon of intensity reverse, so that the exposure convergence method and the image processing device of the present invention can further utilize the gain parameter to transform the input images into the output images, and the output images can be further adjusted via the clip function for showing the forward change of the second intensity even though the ambient light around the image sensor is drastically changed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An exposure convergence method of showing forward change of image intensity in response to drastic change of ambient light, the exposure convergence method comprising:

acquiring an initial intensity of a detection image provided by an image sensor;

providing an exposure setting parameter to the image sensor for generating an input image with a first intensity in accordance with an analysis result of the initial intensity; and utilizing a gain parameter to adjust the input image for generating an output image with a second intensity, so that the second intensity of a plurality of sequential output images is gradually varied in one direction;

wherein the first intensity is lower than the intensity corresponding to a target brightness, and the second intensity determined based on the first intensity and the gain parameter is greater than the intensity corresponding to the target brightness, and the exposure setting parameter and the target brightness correspond to the gain parameter.

2. The exposure convergence method of claim 1, further comprising:

acquiring statistics values of the detection image; and analyzing the statistics values for acquiring the initial intensity.

3. The exposure convergence method of claim 1, further comprising:

analyzing the exposure setting parameter and the target brightness for deciding the gain parameter.

4. The exposure convergence method of claim 1, wherein the first intensity of a plurality of sequential input images is varied in opposite directions.

5. The exposure convergence method of claim 1, wherein intensity variation of parts of a plurality of input images is opposite to intensity variation of corresponding output images.

6. The exposure convergence method of claim 1, further comprising:

acquiring a predefined intensity threshold; and modifying an intensity of at least one pixel inside the output image exceeding the predefined intensity threshold to the predefined intensity threshold.

7. The exposure convergence method of claim 6, further comprising:

analyzing intensity distribution of the output image to decide the predefined intensity threshold.

8. The exposure convergence method of claim 1, further comprising:

acquiring an initial exposure value of the detection image; and setting a predefined exposure threshold to decide the exposure setting parameter lower than the initial exposure value and having a difference between the initial exposure value and the exposure setting parameter equal to the predefined exposure threshold.

9. The exposure convergence method of claim 1, further comprising:

providing the exposure setting parameter to the image sensor for adjusting a shutter speed and a sensor gain of the image sensor.

10. An image processing device of executing an exposure convergence function, the image processing device comprising:

a processing module communicated with an image sensor to acquire a detection image captured by the image sensor, the processing module being adapted to acquire an initial intensity of a detection image provided by an image sensor, provide an exposure setting parameter to the image sensor for generating an input image with a first intensity in accordance with an analysis result of the initial intensity, and utilize a gain parameter to adjust the input image for generating an output image with a second intensity, so that the second intensity of a plurality of sequential output images is gradually varied in one direction;

wherein the first intensity is lower than the intensity corresponding to a target brightness, and the second intensity determined based on the first intensity and the gain parameter is greater than the intensity corresponding to the target brightness, and the exposure setting parameter and the target brightness correspond to the gain parameter.

11. The image processing device of claim 10, wherein the processing module is further adapted to acquire statistics values of the detection image, and analyze the statistics values for acquiring the initial intensity.

12. The image processing device of claim 10, wherein the processing module is further adapted to analyze the exposure setting parameter and the target brightness for deciding the gain parameter.

13. The image processing device of claim 10, wherein the first intensity of a plurality of sequential input images is varied in opposite directions.

14. The image processing device of claim 10, wherein intensity variation of parts of a plurality of input images is opposite to intensity variation of corresponding output images.

15. The image processing device of claim 10, wherein the processing module is further adapted to acquire a predefined intensity threshold, and modify an intensity of at least one pixel inside the output image exceeding the predefined intensity threshold to the predefined intensity threshold.

16. The image processing device of claim 15, wherein the processing module is further adapted to analyze intensity distribution of the output image to decide the predefined intensity threshold.

17. The image processing device of claim 10, wherein the processing module is further adapted to acquiring an initial exposure value of the detection image, and set a predefined exposure threshold to decide the exposure setting parameter lower than the initial exposure value and having a difference between the initial exposure value and the exposure setting parameter equal to the predefined exposure threshold.

18. The image processing device of claim 10, wherein the exposure setting parameter is at least one of a shutter speed and a sensor gain of the image sensor, and the gain parameter belongs to a gain function of the processing module.

* * * * *